(12) United States Patent
Eisaman et al.

(10) Patent No.: US 11,673,329 B2
(45) Date of Patent: Jun. 13, 2023

(54) SENSING AND FEEDBACK FOR THE FORMATION OF COMPLEX THREE-DIMENSIONAL ACOUSTIC FIELDS

(71) Applicant: X Development LLC, Mountain View, CA (US)

(72) Inventors: Matthew Dixon Eisaman, Port Jefferson, NY (US); Dominico P. Julian, Oakland, CA (US); Benoit Schillings, Los Altos Hills, CA (US); Brian John Adolf, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/869,613

(22) Filed: Jul. 20, 2022

(65) Prior Publication Data

US 2022/0355546 A1    Nov. 10, 2022

Related U.S. Application Data

(62) Division of application No. 16/356,357, filed on Mar. 18, 2019, now Pat. No. 11,413,820.

(51) Int. Cl.
*B29C 64/264* (2017.01)
*G03H 1/02* (2006.01)
(Continued)

(52) U.S. Cl.
CPC ............ *B29C 64/264* (2017.08); *B29C 64/10* (2017.08); *B29C 64/393* (2017.08); *G03H 1/0248* (2013.01); *G03H 3/00* (2013.01)

(58) Field of Classification Search
None
See application file for complete search history.

(56) References Cited

U.S. PATENT DOCUMENTS

| 5,546,360 A | 8/1996 | Deegan |
| 6,554,826 B1 | 4/2003 | Deardorff |
(Continued)

FOREIGN PATENT DOCUMENTS

| CN | 101382619 | 3/2009 | |
| EP | 2845719 A2 * | 3/2015 | ......... B29C 67/0077 |
(Continued)

OTHER PUBLICATIONS

Melde et al., "Holograms for acoustics," Nature, Sep. 2016, 537:518-522.

*Primary Examiner* — Yung-Sheng M Tsui
(74) *Attorney, Agent, or Firm* — Fish & Richardson P.C.

(57) ABSTRACT

An apparatus includes a precursor dispenser for dispensing a precursor material into a workspace, one or more acoustic sources configured to direct acoustic waves towards the workspace to provide acoustic fields that arrange the precursor material in a three-dimensional shape in the workspace, one or more sensors configured to detect a distribution of the precursor material in the workspace, and an electronic controller in communication with the precursor dispenser, the one or more acoustic sources, and the one or more sensors, the electronic controller being programmed to cause the one or more acoustic sources to adjust the acoustic fields to reduce deviations in the distribution of the precursor material from the three-dimensional shape in the workspace.

8 Claims, 7 Drawing Sheets

(51) Int. Cl.
*B29C 64/10* (2017.01)
*G03H 3/00* (2006.01)
*B29C 64/393* (2017.01)

(56) References Cited

U.S. PATENT DOCUMENTS

| | | |
|---|---|---|
| 6,766,691 B2 | 7/2004 | Venturelli et al. |
| 6,786,711 B2 | 9/2004 | Koch et al. |
| 10,583,613 B2 | 3/2020 | Bharti et al. |
| 2017/0348907 A1* | 12/2017 | Melde .................. G03H 1/0891 |
| 2020/0001364 A1* | 1/2020 | Short ..................... B33Y 10/00 |
| 2020/0300814 A1 | 9/2020 | Eisaman et al. |

FOREIGN PATENT DOCUMENTS

| | | |
|---|---|---|
| FR | 2979256 | 9/2014 |
| GB | 040294 | 2/2004 |
| WO | WO 2005/078385 | 8/2005 |
| WO | WO 2011/113064 | 9/2011 |

* cited by examiner

SENSING AND FEEDBACK FOR THE FORMATION OF COMPLEX THREE-DIMENSIONAL ACOUSTIC FIELDS

CROSS-REFERENCE TO RELATED APPLICATION

This application is a divisional of, and claims priority to, U.S. patent application Ser. No. 16/356,357, filed on Mar. 18, 2019, and which is incorporated herein by reference.

TECHNICAL FIELD

The disclosure relates to acoustic holography systems that can include sensing and feedback features.

BACKGROUND

Acoustic holography systems use acoustic waves to produce acoustic fields in a workspace. These acoustic fields can create one or more energy extrema that can interact with a medium in the workspace. By controlling the acoustic fields produced by the acoustic waves, an acoustic holography system can assemble the medium into a desired pattern to produce an acoustic hologram.

Typically, acoustic holography systems use one or more arrays of acoustic transducers to produce a desired acoustic hologram in the workspace. In some cases, an acoustic holography system can use a combination of an acoustic transducer and a fixed acoustic diffractive device, such as an acoustic hologram plate, to produce a desired acoustic hologram. The hologram plate is manufactured to diffract incoming acoustic waves from the acoustic transducer to produce a series of diffracted waves. These diffracted waves can interfere with one another to produce a particular acoustic field in the workspace in order to assemble the workspace medium into the desired pattern.

SUMMARY

Acoustic holography systems are typically used to create 2D or relatively simple 3D acoustic holograms due to the complexity of producing more advanced acoustic fields. For example, in systems that use one or more arrays of acoustic transducers to produce a desired acoustic hologram, the number of transducers tends to increase with the complexity of the hologram, making complex designs challenging due to practical constraints. Acoustic hologram plates can allow for more complex acoustic fields without the need for large transducer arrays. However, these plates are designed to produce a particular field, and thus must be replaced to produce a new field. In either case, such conventional approaches are unable to identify and reduce deviations from a desired acoustic field using, for example, a variable hologram plate and/or feedback principles.

Various aspects of the present disclosure are summarized as follows.

In general, in an aspect, the present disclosure features an apparatus including a precursor dispenser for dispensing a precursor material into a workspace, one or more acoustic sources configured to direct acoustic waves towards the workspace to provide acoustic fields that arrange the precursor material in a three-dimensional shape in the workspace, one or more sensors configured to detect a distribution of the precursor material in the workspace, and an electronic controller in communication with the precursor dispenser, the one or more acoustic sources, and the one or more sensors, the electronic controller being programmed to cause the one or more acoustic sources to adjust the acoustic fields to reduce deviations in the distribution of the precursor material from the three-dimensional shape in the workspace.

Implementations of the apparatus can include one or a combination of two or more of the following features and/or features of other aspects.

The one or more acoustic sources can include an array of transducers. The one or more acoustic sources can include at least one transducer in combination with an acoustic diffractive device.

The acoustic diffractive device can be a variable acoustic diffractive device. The variable acoustic diffractive device can include an electrorheological fluid and an array of electrodes arranged to independently provide an electric field to a corresponding portion of the electrorheological fluid in response to signals from the electronic controller.

The variable acoustic diffractive device can include a non-Newtonian fluid and an array of actuators arranged to independently provide a mechanical stress to a corresponding portion of the non-Newtonian fluid in response to signals from the electronic controller.

The variable acoustic diffractive device can include two or more microfluidic channels and a pump arranged to move a fluid into or out of a selected microfluidic channel in response to signals from the electronic controller.

The apparatus can include a curing device configured to cure the precursor material in the workspace in response to signals from the electronic controller. The curing device can include a radiation source or a reagent source. The electronic controller can be programmed to cause the curing device to cure the precursor material in the workspace in response to determining that the deviations in the distribution of the precursor material from the three-dimensional shape are less than a predetermined threshold.

The acoustic fields can include one or more energy extrema sufficient to trap the precursor material in the three-dimensional shape in the workspace.

The apparatus can include a chamber enclosing the workspace.

In general, in an aspect, the present disclosure features a method including directing acoustic waves toward a workspace to arrange a precursor material in a three-dimensional shape in the workspace, determining, using one or more sensors, a distribution of the precursor material in the workspace, and adjusting the acoustic waves to reduce deviations in the distribution of the precursor material from the three-dimensional shape in the workspace.

Implementations of the method can include one or a combination of two or more of the following features and/or features of other aspects.

The method can include curing at least a portion of the precursor material in the workspace in response to determining that the deviations in the distribution of the portion of the precursor material from the three-dimensional shape are less than a predetermined threshold.

The acoustic waves can be provided by an array of transducers. The acoustic waves can be provided by at least one transducer in combination with an acoustic diffractive device.

The acoustic diffractive device can be a variable acoustic diffractive device. The variable acoustic diffractive device can include an electrorheological fluid and an array of electrodes arranged to independently provide an electric field to a corresponding portion of the electrorheological fluid in response to signals from an electronic controller.

The variable acoustic diffractive device can include a non-Newtonian fluid and an array of actuators arranged to independently provide a mechanical stress to a corresponding portion of the non-Newtonian fluid in response to signals from an electronic controller.

The variable acoustic diffractive device can include two or more microfluidic channels and a pump arranged to move a fluid into or out of a selected microfluidic channel in response to signals from an electronic controller.

In general, in an aspect, the present disclosure includes a 3D printing system including a precursor dispenser for dispensing a precursor material into a workspace, the precursor material being curable upon exposure to a curing agent, a curing device positioned to supply the curing agent to the workspace, one or more acoustic sources for directing acoustic waves towards the workspace such that the acoustic waves provide acoustic fields to arrange the precursor material in a three-dimensional shape in the workspace, one or more sensors for detecting a distribution of the precursor material in the workspace, and an electronic controller in communication with the precursor dispenser, the curing device, the one or more acoustic sources, and the one or more sensors, the electronic controller being programmed to supply signals to cause the one or more acoustic sources to adjust the acoustic fields to reduce deviations in the distribution of the precursor material from the three-dimensional shape in the workspace and supply signals to cause the curing device to cure at least a portion of the precursor material in the workspace in response to determining that the deviations in the distribution of the portion of the precursor material from the three-dimensional shape are less than a predetermined threshold.

Among other advantages, the present disclosure can provide for a variable acoustic diffractive device that can enable an acoustic holography system to dynamically control the acoustic fields it produces. This can allow the system to create arbitrary 2D or 3D acoustic holograms without the need for large transducer arrays. Moreover, the variable acoustic diffractive device can enable the system to change the acoustic field without the need to manufacture a new acoustic hologram plate. The techniques described here can also enable an acoustic holography system to identify deviations from a desired acoustic field and correct them in real time.

Other advantages will be apparent from the description below and the claims.

BRIEF DESCRIPTION OF THE DRAWINGS

Like reference numbers and designations in the various drawings indicate like elements.

DETAILED DESCRIPTION

Acoustic holography systems are disclosed that include a variable acoustic diffractive device having one or more diffractive elements with independently controllable acoustic properties. By varying the acoustic properties of the diffractive elements, the system can dynamically control the acoustic fields it produces in a workspace in order to manipulate a medium in the workspace. Also disclosed are acoustic holography systems having a sensor unit that can identify the distribution of the medium in the workspace. The sensor unit can feed this information back to the system to enable the system to correct for deviations from the desired distribution in real time.

Figure 1:
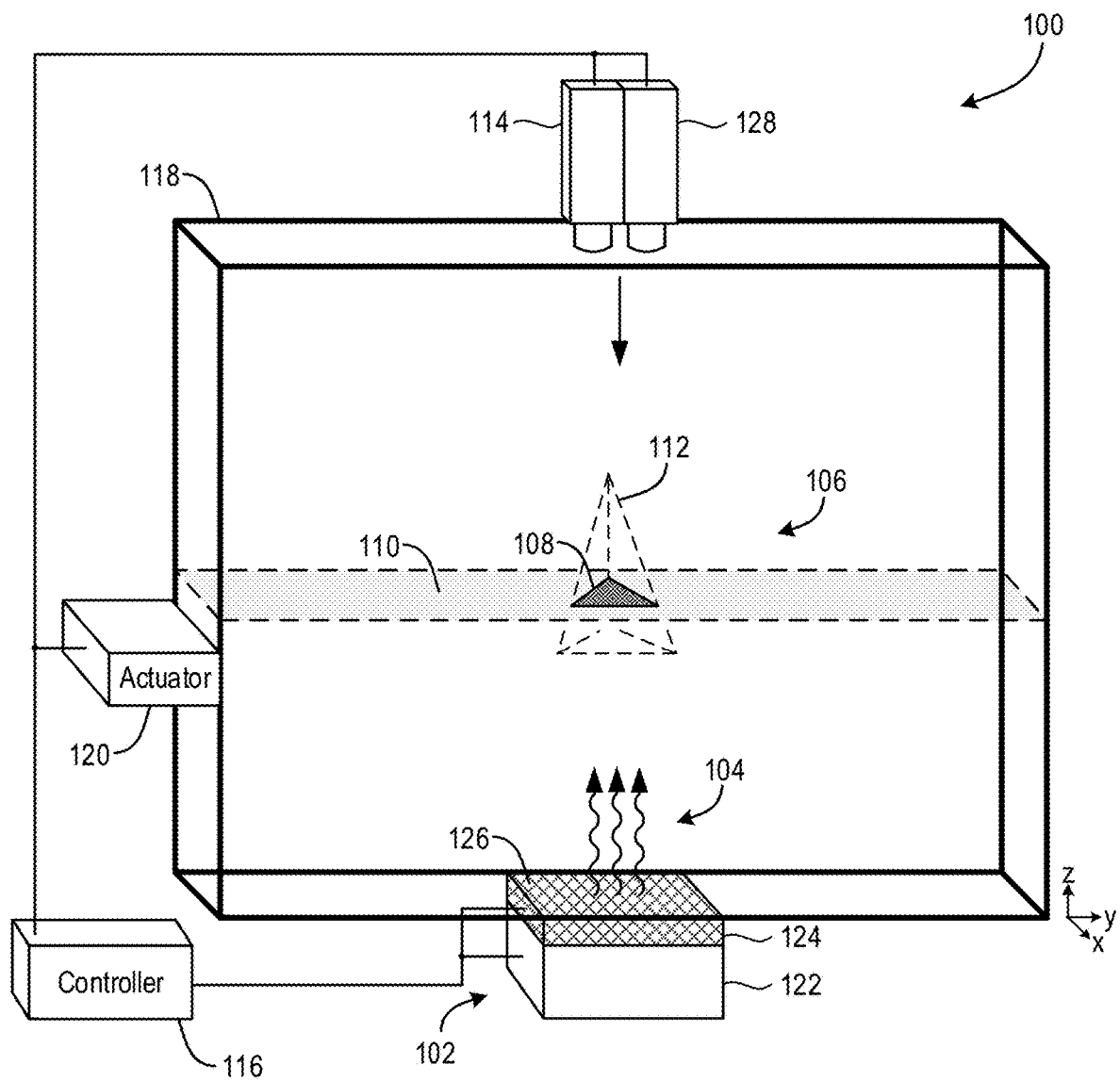
FIG. 1 is a schematic diagram of an acoustic holography system in accordance with one embodiment.

FIG. 1 illustrates an acoustic holography system 100 that includes an acoustic assembly 102 for generating acoustic waves 104 within a workspace 106. As the acoustic waves 104 propagate within the workspace 106, they produce acoustic fields that can interact with a medium in the workspace 106. By controlling the acoustic waves 104, the acoustic holography system 100 can produce acoustic fields that can assemble or otherwise manipulate the medium into desired positions within the workspace 106 in order to, for example, produce a desired two-dimensional or three-dimensional pattern. The term "pattern" as used herein includes any two-dimensional or three-dimensional arrangement, structure, or other formation and is not limited to formations that are symmetric or that repeat in a predictable manner.

For example, in some implementations, the acoustic holography system 100 can generate acoustic waves 104 that produce an acoustic field having a predetermined acoustic pressure and phase distribution in a certain plane 110 of the workspace 106. The acoustic pressure and phase distribution can create nodes that force the medium to assemble into a desired two-dimensional acoustic hologram 108 in the plane 110 of the workspace 106. In some implementations, the acoustic holography system 100 can generate acoustic waves 104 that produce predetermined acoustic pressure and phase distributions across multiple planes 110 to assemble the medium into a desired three-dimensional acoustic hologram 112 in the workspace 106. In some cases, the acoustic holography system 100 can be configured to vary the acoustic waves 104 to dynamically adjust the acoustic pressure and phase distributions in real time, for example, to reconfigure, move, rotate, or otherwise manipulate the medium or other objects within the workspace 106.

In general, the medium in the workspace 106 can be any gas, liquid, or semisolid medium, or a medium formed from a mixture of one or more gases, liquids, and/or solids. For example, in some implementations, the medium can include a precursor material, such as plastic particles, polymer particles, metal particles, glass particles, ceramic particles, wood particles, composite particles, metamaterial particles, or other solid or liquid particles, mixed with a liquid or gas. In some cases, the medium can include one or more objects, such as biological cells, suspended in a liquid or gas. In some implementations, the medium can include a mixture of two or more gases, liquids, or solids having the same or similar densities to facilitate suspension and manipulation of the medium and its individual components.

Acoustic holography system 100 includes a dispenser 114 for dispensing the medium into the workspace 106 in response to signals from an electronic controller 116. The electronic controller 116 can include one or more processors and non-transitory storage media coupled with electronic signaling hardware to produce the signals that control the dispenser 114 and other components of the acoustic holography system 100. The dispenser 114 may be configured to control the size and shape of the medium and its individual components to ensure consistent operation of the acoustic holography system 100. The acoustic holography system 100 also includes a receptacle 118 to contain the medium within the workspace 106. In some cases, the receptacle 118 is coupled with an actuator 120 configured to vary the position of the receptacle 118 along one or more dimensions in response to signals from the electronic controller 116. In doing so, the electronic controller 116 varies the relative position between the acoustic assembly 102 and the workspace 106.

In order to generate the acoustic waves 104 within the workspace 106, the acoustic assembly 102 includes an acoustic source 122. The acoustic source 122 can include one or more transducers, such as a piezoelectric transducer or another acoustic transducer. In some implementations, the acoustic source 122 can include an array of individually addressable transducers or a phased array transducer. Moreover, in some cases, the acoustic holography system 100 can include multiple acoustic sources 122 and/or acoustic assemblies 102 arranged at different positions around the workspace 106.

Each of the transducers within the acoustic source 122 can be coupled with the electronic controller 116 and can be configured to generate acoustic waves at one or more amplitudes, phases, and/or frequencies in response to signals from the electronic controller 116. In general, the acoustic source 122 can be configured to operate at any frequency. In some implementations, the acoustic source 122 can operate at ultrasonic frequencies (i.e., frequencies above approximately 20 kHz) so that the acoustic waves it generates are above the upper audible limit of human hearing.

In some implementations, the acoustic source 122 can generate acoustic waves 104 that produce a desired acoustic pressure and phase distribution within the workspace 106 without the need for any intervening acoustic elements. For example, the electronic controller 116 can calculate the transducer inputs that generate a set of acoustic waves that can interfere to produce a desired acoustic pressure and phase distribution in a particular plane 110 for a given workspace 106 medium. In some cases, the electronic controller 116 can perform such a calculation across multiple planes 110 to determine a set of acoustic waves that produce a desired three-dimensional acoustic pressure and phase distribution in the workspace 106. The electronic controller 116 can then control the amplitude, phase, and/or frequency of the transducers within the acoustic source 122 to generate the set of acoustic waves and produce the desired acoustic pressure and phase distribution.

The acoustic assembly 102 includes an acoustic diffractive device 124 positioned between the acoustic source 122 and the workspace 106. The acoustic diffractive device 124 can include one or more diffractive elements 126 configured to diffract incoming acoustic waves generated by the acoustic source 122. The acoustic properties of each of the diffractive elements 126 can be selected to alter the phase and/or amplitude of the incoming acoustic waves to produce diffracted acoustic waves in the workspace 106. These diffracted acoustic waves can self-interfere to form the acoustic waves 104 that produce a desired acoustic pressure and phase distribution in the workspace 106.

For example, in some implementations, the desired acoustic pressure and phase distribution in the workspace 106 can be converted into a series of phase and/or amplitude shifts that can be applied by the acoustic diffractive device 124. Such a calculation can be carried out by, for example, the electronic controller 116 using an angular spectrum algorithm, a Gerchberg-Saxton algorithm, or any other inverse diffraction algorithm. The calculation can also account for the frequency of the incoming acoustic waves from the acoustic source 122, the acoustic properties of the medium within the workspace 106, and gravitational forces, among others. One or more acoustic properties, such as the acoustic impedance, of each diffractive element 126 can be selected to apply the calculated phase and/or amplitude shift to the incoming acoustic waves in order to produce the desired acoustic pressure and phase distribution in the workspace 106. The acoustic properties of each diffractive element 126 can be selected, for example, by selecting the thickness of the diffractive element (e.g., the thickness along the z-axis in FIG. 1) and/or by selecting the material of the diffractive element, among others.

By including the acoustic diffractive device 124 in the acoustic assembly 102, the acoustic holography system 100 can produce asymmetric acoustic pressure and phase distributions in the workspace 106. Further, the acoustic holography system 100 can achieve greater precision and can exert finer control over the distribution than in implementations where only an acoustic source is used. Moreover, the system can produce the desired acoustic pressure and phase distribution using a single transducer instead of relying on multiple transducers which may reduce system cost and complexity.

As shown in FIG. 1, in some implementations, the acoustic diffractive device 124 can be in contact with the acoustic source 122 or otherwise in the near-field of the acoustic source 122. In other implementations, the acoustic diffractive device 124 can be positioned at a distance from the acoustic source 122 such that it is in the far field of the acoustic source 122.

In some implementations, the surface dimensions of the acoustic diffractive device 124 can be sized to match the surface dimensions of the acoustic source 122. Although the acoustic source 122 and the acoustic diffractive device 124 are depicted as having a generally rectangular surface, other arrangements, such as a circular surface, are equally compatible with the techniques described here.

In general, the acoustic diffractive device 124 can be a transmissive diffractive device or a reflective diffractive device. In some implementations, one or more transmissive and/or reflective diffractive devices can be combined to create the acoustic diffractive device 124.

In some implementations, the acoustic diffractive device 124 can be a fixed acoustic diffractive device, such as a holographic plate, configured to produce a particular acoustic pressure and phase distribution in the workspace 106. Such a device can be manufactured, for example, from a plastic or another acoustically transmissive material using techniques such as 3D printing or injection molding, among others. The fixed acoustic diffractive device can be replaceable within the acoustic holography system 100 to enable the system to produce different acoustic pressure and phase distributions as desired. In some implementations, the fixed acoustic diffractive device 124 can be configured to produce different acoustic pressure and phase distributions, for example, in response to different frequency waves from the acoustic source 122 or by employing the principle of holographic redundancy.

In some implementations, the acoustic diffractive device 124 can be a variable acoustic diffractive device. The variable acoustic diffractive device can include one or more independently controllable diffractive elements configured to adjust their acoustic properties in response to signals from the electronic controller 116. This in turn enables the electronic controller 116 to dynamically adjust the acoustic pressure and phase distribution in the workspace 106 in real time without the need to manufacture a new acoustic diffractive device.

Figure 2A:
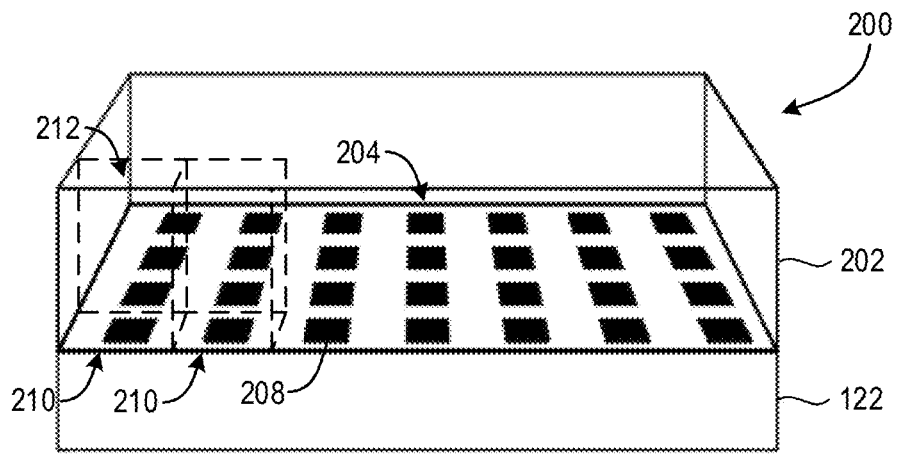
FIGS. 2A, 2B, and 2C are schematic diagrams of a variable acoustic diffractive device in accordance with one embodiment.
Figure 2B:
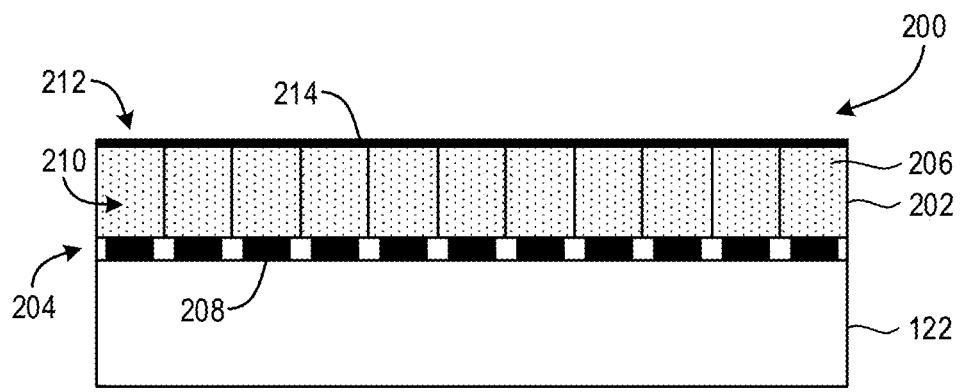
Figure 2C:
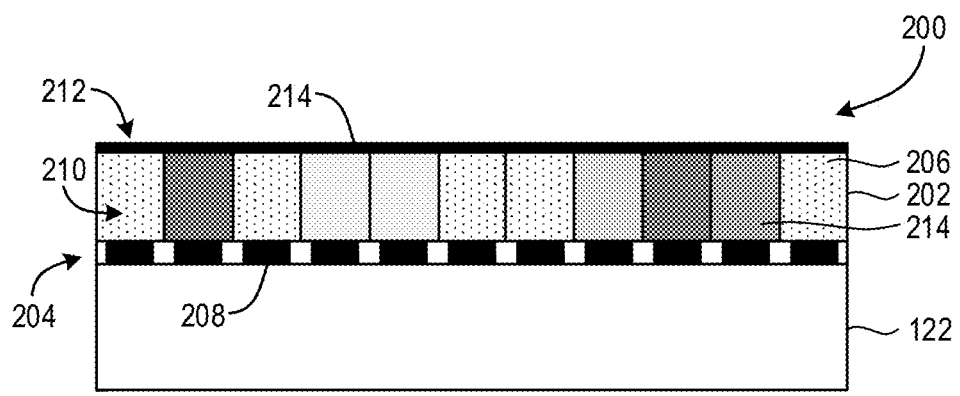

FIGS. 2A-C illustrate a variable acoustic diffractive device 200 in accordance with one embodiment of the present disclosure. The variable acoustic diffractive device 200 includes a fluid chamber 202 divided into an array of sub-chambers 210. Each sub-chamber 210 includes walls that define the boundaries of an individually controllable diffractive element 212. Moreover, each sub-chamber 210 contains an electrorheological (ER) fluid 206 whose apparent viscosity changes in response to an electric field. The fluid chamber 202 is positioned above an electrode array 204 such that each sub-chamber 210 of the fluid chamber 202 is associated with one or more electrodes 208 of the electrode array 204. Each electrode 208 can be individually addressable by the electronic controller 116, for example, to allow the electronic controller 116 to apply a selected voltage to each individual electrode 208. The variable acoustic diffractive device 200 also includes a common ground electrode 214 positioned at a distance from the electrode array 204.

By applying a voltage to one or more of the electrodes 208 in the electrode array 204, the electronic controller 116 can create an electric field within a corresponding sub-chamber 210 of the fluid chamber 202. This in turn changes the viscosity of the ER fluid 206 within the sub-chamber 210. For example, FIG. 2B illustrates the variable acoustic diffractive device 200 having ER fluid 206 with a uniform viscosity in the absence of an electric field in any of the sub-chambers 210, and FIG. 2C illustrates the variable acoustic diffractive device 200 having an increased viscosity ER fluid 214 in response to an electric field in some of the sub-chambers 210, with darker shading representing higher viscosity ER fluid 214. This change in viscosity can produce a corresponding change in the acoustic properties of the ER fluid 206, such as the acoustic impedance of the fluid and/or the speed of sound in the fluid in the presence of boundaries. Thus, by adjusting the voltage applied to each of the electrodes 208, the electronic controller 116 can dynamically change the acoustic properties of the diffractive elements 212 in the variable acoustic diffractive device 200. In this way, the electronic controller 116 can configure the variable acoustic diffractive device 200 to apply a predetermined phase and/or amplitude shift to the incoming acoustic waves from the acoustic source 122 in order to produce a desired acoustic pressure and phase distribution in the workspace 106. The resultant acoustic pressure and phase distribution can assemble or otherwise manipulate the medium into desired positions within the workspace 106 in order to, for example, produce an acoustic hologram or reconfigure, move, rotate, or otherwise manipulate the medium within the workspace 106.

Various modifications to the variable acoustic diffractive device 200 are possible. For example, in some implementations, the variable acoustic diffractive device 200 may not include a common ground electrode 214 and may instead use the electrodes 208 in the electrode array 204 or another electrode array to define the electric field. Moreover, in some implementations, the fluid chamber 202 may not be divided into an array of sub-chambers 210. In some cases, one or more walls of each sub-chamber can be electrically conductive to create one or more electrodes 208 used to produce the electric field within the sub-chamber. Although the electrode array 204 is depicted as containing a specific number of electrodes 208, the variable acoustic diffractive device 200 can generally include any number of electrodes 208 in the electrode array 204. Similarly, although the fluid chamber 202 is depicted as containing a specific number of sub-chambers 210, the fluid chamber 202 can generally be divided into any number of sub-chambers 210. In some cases, the electrodes 208 and/or the sub-chambers 210 can be arranged to form a 3D array of independently controllable diffractive elements.

In some implementations, the variable acoustic diffractive device 200 can include a non-Newtonian fluid combined with the ER fluid 206. In such a case, the electronic controller 116 can cause the acoustic source 122 to transmit acoustic waves at a high frequency to increase the viscosity of the non-Newtonian fluid. This feature can be useful in order to lock-in or freeze the configuration of the fluids in the variable acoustic diffractive device 200, for example, after the device is configured to produce a desired acoustic pressure and phase distribution in the workspace 106. In doing so, the electronic controller 116 can reduce power consumption (e.g., by cutting off voltage to the electrodes 208 in the electrode array 204) and can avoid inaccuracies in the desired acoustic pressure and phased distribution that may be caused by variations in the electric field during operation. To change the configuration of the variable acoustic diffractive device 200, the electronic controller 116 can cause the acoustic source 122 to stop transmitting or to transmit acoustic waves at a low frequency to return the non-Newtonian fluid to its normal viscosity state.

In some implementations, a non-Newtonian fluid can be used in place of the ER fluid 206. In this case, the electrode array 204 can be used to form an array of individually addressable electrostatic actuators (or can be replaced with another array of individually addressable actuators, such as mechanical or hydraulic actuators, among others). Each actuator can be arranged to independently provide a mechanical stress to a corresponding portion of the non-Newtonian fluid in response to the signals from the electronic controller 116. By adjusting the mechanical stress applied by one or more of the actuators, the electronic controller 116 can dynamically change the acoustic properties of a corresponding diffractive element in the modified variable acoustic diffractive device. In this way, the electronic controller 116 can configure the device to apply a predetermined phase and/or amplitude shift to the incoming acoustic waves from the acoustic source 122 in order to produce a desired acoustic pressure and phase distribution in the workspace 106.

In some implementations, the ER fluid 206 (or the fluid chamber 202) can be combined with or replaced by an electroactive polymer that exhibits a change in size or shape in response to an electric field. By adjusting the voltage applied to each of the electrodes 208, the electronic controller 116 can cause the electroactive polymer to deform to dynamically change the acoustic properties of the diffractive elements in the modified variable acoustic diffractive device. In this way, the electronic controller 116 can configure the variable acoustic diffractive device to apply a predetermined phase and/or amplitude shift to the incoming acoustic waves from the acoustic source 122 in order to produce a desired acoustic pressure and phase distribution in the workspace 106.

In some implementations, the fluid chamber 202 can be deformed to dynamically change the acoustic properties of the variable acoustic diffractive device 200. For example, in some cases, some or all of the chamber 202 can be formed from an elastomer, such as an elastomeric dielectric, or another flexible material. In some cases, the chamber 202 can be a solid component (that is, without an internal cavity for the ER fluid 206). In some cases, the chamber 202 (which may or may not include the sub-chambers 210) can contain the fluid 206, which may include or be replaced by a liquid or solid dielectric material. By adjusting the voltage applied to each of the electrodes 208, the electronic controller 116 can cause each electrode 208 to actuate a predetermined distance towards the ground plane 214 or a corresponding electrode of another electrode array on the opposite side of the chamber 202 as the electrodes 208. In this way, the electronic controller 116 can cause the fluid chamber 202 to selectively deform (which can displace and pressurize the fluid 206, if included within the chamber 202) to dynamically change the acoustic properties of the diffractive elements in the variable acoustic diffractive device.

Figure 3:
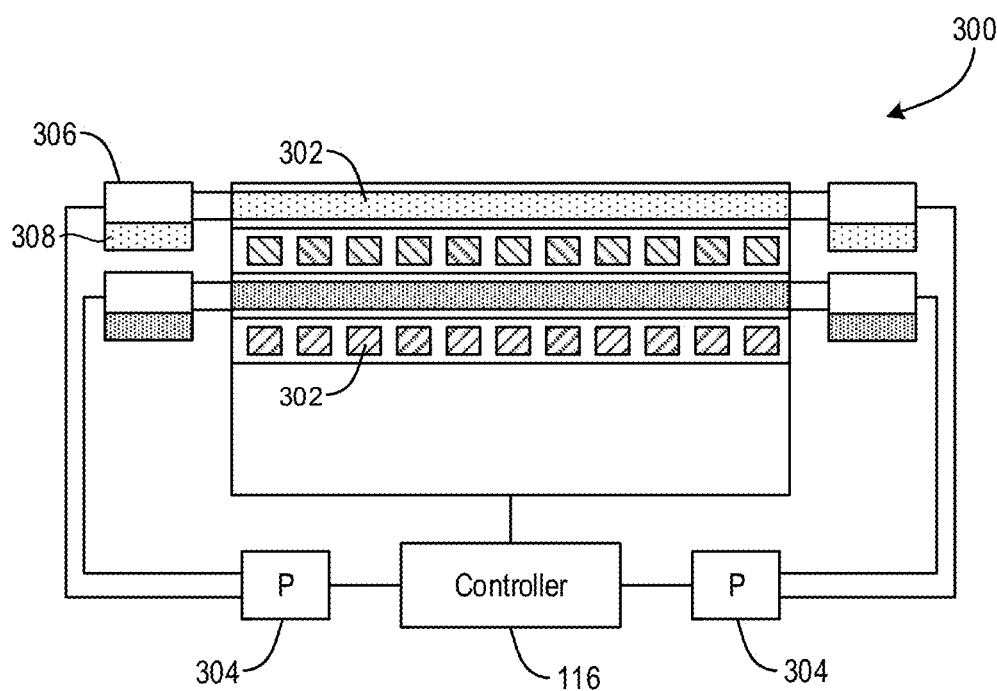
FIG. 3 is a schematic diagram of a variable acoustic diffractive device in accordance with another embodiment.

FIG. 3 illustrates a variable acoustic diffractive device 300 in accordance with another embodiment of the present disclosure. The variable acoustic diffractive device 300 includes a series of microfluidic channels 302 and at least one pump 304 arranged to move a fluid 308 into or out of a selected microfluidic channel 302 in response to signals from the electronic controller 116. In general, the variable acoustic diffractive device 300 can include any number of microfluidic channels 302. In some implementations, the variable acoustic diffractive device 300 can include multiple layers of microfluidic channels stacked on top of one another, as shown in FIG. 3. Moreover, the variable acoustic diffractive device 300 includes one or more reservoirs 306 to hold a particular fluid 308 as it is moved into and out of a microfluidic channel 302. Although the variable acoustic diffractive device 300 can generally include any fluid 308, in some implementations, the fluids 308 may be selected based on one or more of their acoustic properties, such as their density or acoustic impedance.

The variable acoustic diffractive device 300 can be configured to diffract incoming waves from the acoustic source 122 to produce a desired acoustic pressure and phase distribution in the workspace 106. For example, the electronic controller 116 can obtain information regarding the acoustic properties of each fluid 308, and can move one or more of the fluids 308 into or out of a selected microfluidic channel 302 to alter the phase and/or amplitude of the incoming acoustic waves. In this way, the electronic controller 116 can produce a desired acoustic pressure and phase distribution in the workspace 106 in order to assemble or otherwise manipulate the medium or other objects in the workspace 106.

In some implementations, each pump 304 included in the variable acoustic diffractive device 300 can be a mechanical pump, such as a pressure pump, a syringe pump, a peristaltic pump, or any other mechanical pump capable of manipulating small volumes. In cases where a dielectric fluid is used, each pump 304 can be an electrohydrodynamic pump, such as an electroosmotic pump.

Referring back to FIG. 1, in some implementations, the acoustic holography system 100 can be a three-dimensional (3D) printing system. In such a case, the electronic controller 116 can cause the dispenser 114 to dispense a medium containing a precursor material into the workspace 106, and can configure the acoustic assembly 102 to generate acoustic waves 104 that produce a predetermined acoustic pressure and phase distribution within the workspace 106, as described above. The acoustic pressure and phase distribution can assemble the precursor material into the desired 3D structure to be printed. The electronic controller 116 can then send signals to a curing device 128 to cause the device to emit a curing agent, such heat, ultraviolet (UV) light, or a reagent, among others, in order to cure all of, or a selected section of, the assembled precursor material. For example, in some cases, the electronic controller 116 can divide the 3D structure into one or more sections of arbitrary shape, and can cause the curing device 128 to cure the medium that forms each section. This process can be repeated until all of the sections of the 3D structure are cured. In some cases, each section can be cured in a predetermined curing order determined by the electronic controller 116 in order to, for example, minimize mechanical stress in the resulting 3D structure and/or enable curing of a 3D structure whose geometry does not allow all in one curing due to shadowing, among others.

To print more complex 3D structures, or to print arbitrary 3D structures with greater accuracy and precision, the acoustic holography system 100 can include a variable acoustic diffractive device in the acoustic assembly 102. In this case, the electronic controller 116 can break the 3D structure into a series of two-dimensional (2D) images, and can configure the variable acoustic diffractive device to produce an acoustic pressure and phase distribution in a plane 110 of the workspace 106 that corresponds to the first image in the series of 2D images. The acoustic pressure and phase distribution can assemble the precursor material into the desired 2D image in the plane 110, and the electronic controller 116 can cause the curing device 128 to cure the assembled precursor material. The electronic controller 116 can then adjust the acoustic properties of one or more diffractive elements in the variable acoustic diffractive device to produce a new acoustic pressure and phase distribution in an adjacent plane 110 in the workspace 106 that corresponds to a second image in the series of 2D images. In some cases, the electronic controller 116 can use the actuator 120 to move the workspace 106 in addition to or instead of reconfiguring the variable acoustic diffractive device. In either case, the newly formed distribution can assemble the precursor material into the desired positions in the adjacent plane 110, and the electronic controller 116 can cause the curing device 128 to cure the assembled precursor material to the previously cured layer. This process can be repeated until the desired 3D structure is formed.

Figure 4:
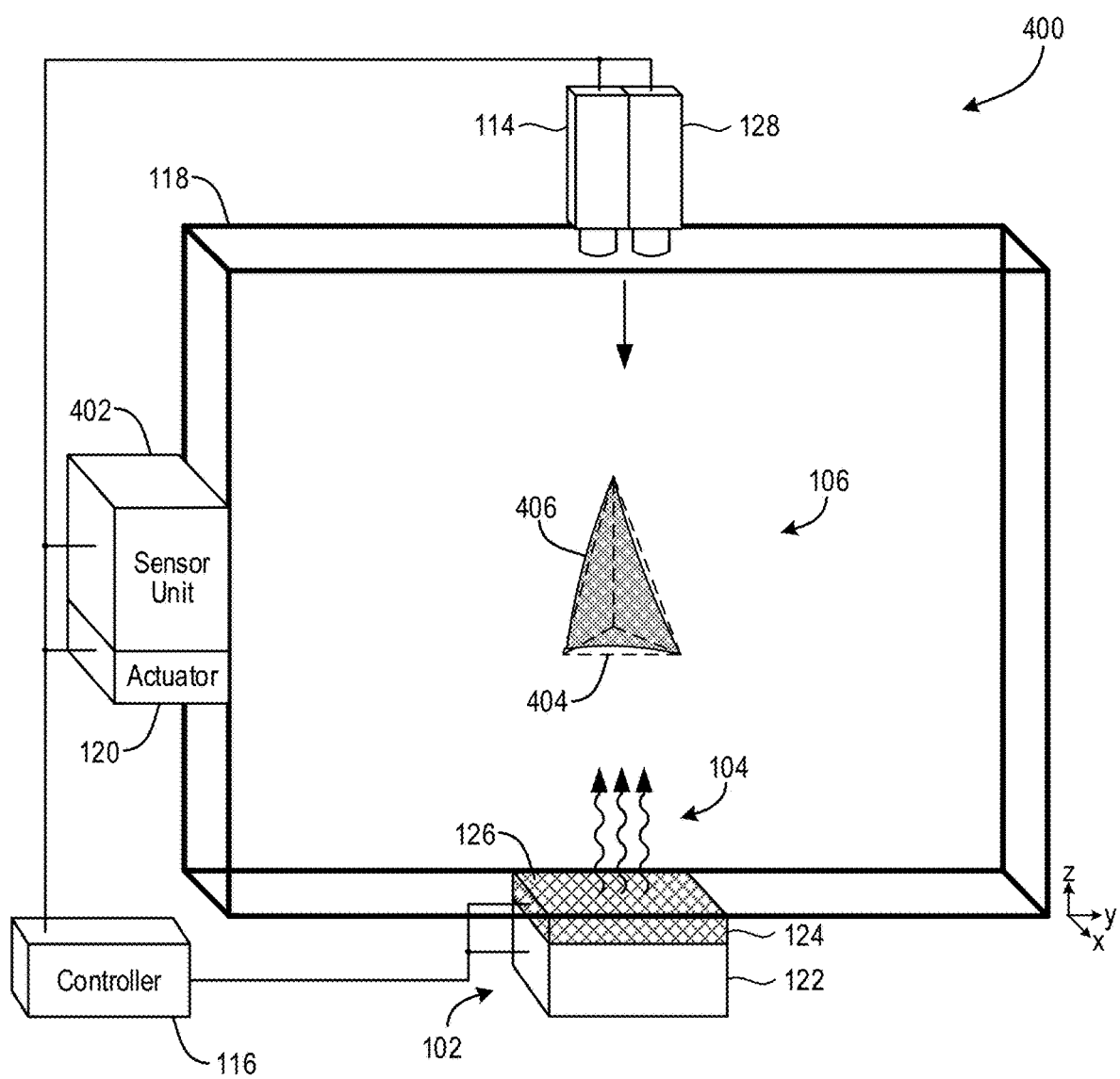
FIG. 4 is a schematic diagram of an acoustic holography system in accordance with another embodiment.

FIG. 4 shows an acoustic holography system 400 in accordance with another embodiment of the present disclosure. The acoustic holography system 400 can include one or more of the features and functions of the acoustic holography system 100. Thus, repetitive description of like elements is omitted for the sake of brevity.

In general, the acoustic holography system 400 includes an electronic controller 116 configured to control an acoustic assembly 102 to generate acoustic waves 104 that produce a desired acoustic pressure and phase distribution in the workspace 106. In some implementations, the desired distribution can be produced directly by an acoustic source 122 having an array of acoustic transducers (e.g., a phased array transducer) without any intervening acoustic elements. In other implementations, the distribution can be produced by a fixed or variable acoustic diffractive device configured to diffract incoming waves from the acoustic source 122. The acoustic pressure and phase distribution can manipulate the medium in the workspace 106 to produce, for example, a desired two-dimensional or three-dimensional acoustic hologram.

Given the complexity of producing the desired acoustic pressure and phase distribution in the workspace 106, as well as the circular effect that a change in the workspace 106 can have on the intended distribution, it may be desirable to allow for feedback within the acoustic holography system. Accordingly, the acoustic holography system 400 includes a sensor unit 402 configured to monitor the distribution of the medium within the workspace 106 in real time. The sensor unit 402 can include one or more sensors, such as an image sensor, an ultrasound sensor, a computed tomography sensor, a micro-CT sensor, an optical tomography sensor, an infra-red (IR) sensor, or a LIDAR sensor, among others. Each sensor in the sensor unit 402 can provide information regarding the distribution in the workspace 106 to the electronic controller 116 in real time.

The electronic controller 116 can use the information received from the sensor unit 402 to reduce deviations in the acoustic pressure and phase distribution within the workspace 106. For example, the electronic controller 116 can compare the intended medium distribution 404 (e.g., as defined by the intended 2D or 3D hologram structure) with the actual medium distribution 406 (e.g., as defined by the information received from the sensor unit 402) to determine the differences. The electronic controller 116 may then apply one or more optimization algorithms to determine which amplitude, phase, and/or frequency adjustments can be made to reduce the differences and improve the distribution. In some cases, the electronic controller 116 can use one or more machine learning or pattern recognition algorithms to determine which adjustments are most appropriate to reduce the differences. In some implementations, the electronic controller 116 can apply one or more thresholds to the difference information to determine whether an adjustment to the distribution should be made.

After identifying one or more adjustments to the distribution, the electronic controller 116 can configure the acoustic assembly 102 to apply the adjustments. In some implementations, the electronic controller 116 can apply the adjustments by altering the amplitude, phase, and/or frequency of one or more transducers within the acoustic source 122. The electronic controller 116 can also apply the adjustments by dynamically altering the acoustic properties of one or more diffractive elements in the variable diffractive device. In this way, the acoustic holography system 400 can identify and correct deviations in an intended acoustic pressure and phase distribution in real time through adjustments to the acoustic assembly 102.

For instance, in some implementations, the acoustic holography system 400 can be a 3D printing system. Rather than printing a 3D structure using a series of 2D layers as described above, the acoustic holography system 400 can produce a complex 3D acoustic pressure and phase distribution within the workspace 106. The acoustic holography system 400 can then use the feedback provided by the sensor unit 402 to reduce any deviations in the distribution until a precursor material included in the medium is arranged in the 3D structure with a desired level of accuracy. The acoustic holography system 400 can then cause a curing device 128 to cure all of, or a selected section of, the precursor material to produce the 3D structure. In doing so, the acoustic holography system 400 may print the 3D structure with greater speed and/or accuracy than the layer-by-layer approach.

In some cases, the electronic controller 116 can divide the 3D structure into one or more sections of arbitrary shape, and can cause the curing device 128 to cure the medium that forms each section until all of the sections of the 3D structure are cured. For example, the electronic controller 116 may use the feedback provided the sensor unit 402 to determine that the medium is arranged within a desired level of accuracy for a particular section of the 3D structure. The controller can then cause the curing device 128 to cure the precursor material in the medium that corresponds to the section of the 3D structure. The electronic controller 116 can also cause each section to be cured in a predetermined curing order calculated in order to, for example, minimize mechanical stress in the resulting 3D structure and/or enable curing of a 3D structure whose geometry does not allow all in one curing due to shadowing, among others.

The acoustic holography systems described herein can also be applied in various other contexts. For example, in some cases, the acoustic holography system can be applied in the medical context for diagnostics, such as in elastography or other medical imaging, or for medical treatment, such as by manipulating biological cells or other objects within a person. In other cases, the acoustic holography system can be applied to facilitate contactless power transfer, 2D or 3D imaging, 2D or 3D visualization, provide haptic feedback, or to move voids, deviations, defects, grain boundaries, fibers, or other inhomogeneities within a medium to a desired location, alignment, or pattern, or to remove them from the medium altogether.

Figure 5:
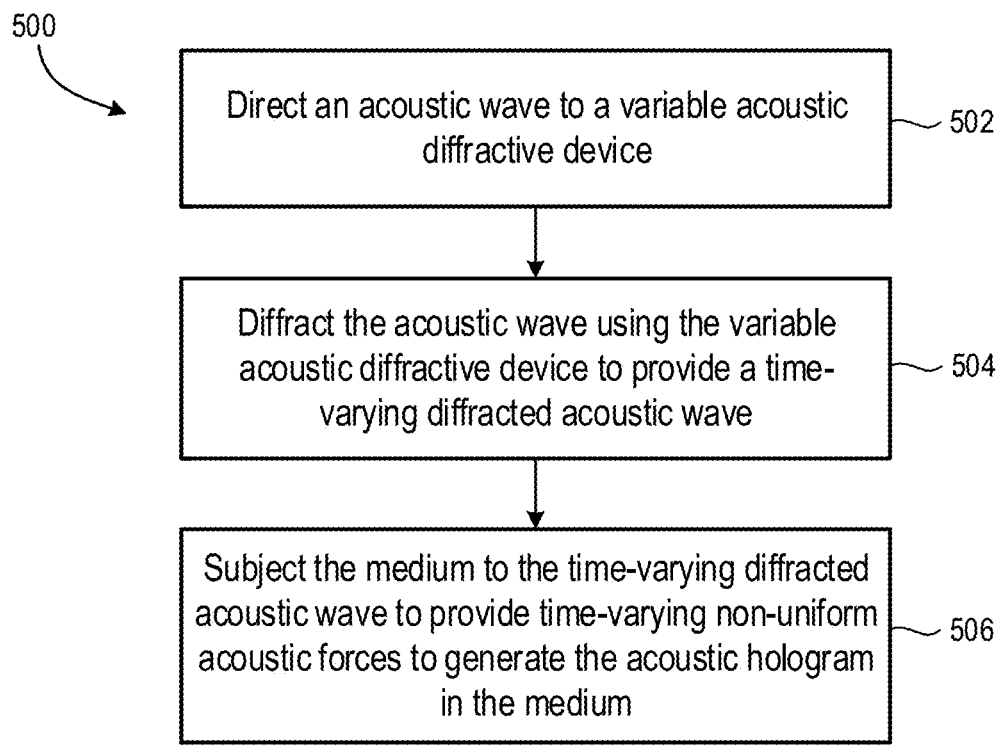
FIG. 5 is a flowchart of a process for generating an acoustic hologram in a medium in accordance with one embodiment.

FIG. 5 is a flowchart of a process 500 for generating an acoustic hologram in a medium in accordance with one embodiment. At least a portion of the process 500 can be implemented using one or more processors operating within the electronic controller 116. Operations of the process 500 include directing an acoustic wave to a variable acoustic diffractive device (502). In some implementations, the variable acoustic diffractive device includes an electrorheological fluid and an array of electrodes arranged to independently provide an electric field to a corresponding portion of the electrorheological fluid in response to signals from an electronic controller. In other implementations, the variable acoustic diffractive device includes a non-Newtonian fluid and an array of actuators arranged to independently provide a mechanical stress to a corresponding portion of the non-Newtonian fluid in response to signals from an electronic controller. In other cases, the variable acoustic diffractive device includes two or more microfluidic channels and a pump arranged to move a fluid into or out of a selected microfluidic channel in response to signals from an electronic controller.

Operations of the process 500 also include diffracting the acoustic wave using the variable acoustic diffractive device to provide a time-varying diffracted acoustic wave in a workspace (504). The workspace can be a plane or multiple planes. The acoustic forces from the diffracted acoustic wave in the workspace can cause a non-uniform distribution of the medium in accordance with a predetermined pattern.

The process 500 further includes subjecting the medium to the time-varying diffracted acoustic wave in the workspace to provide time-varying non-uniform acoustic forces to generate the acoustic hologram in the medium (506). In some implementations, the medium can be a precursor material curable upon exposure to a curing agent, such as a radiation source or a reagent source, and an electronic controller can cause a curing device to supply the curing agent to the workspace. In some cases, the electronic controller can be programmed to cause the variable acoustic diffractive device to vary the non-uniform acoustic forces to move adjust the medium. In some cases, an imaging device can image the workspace while the non-uniform acoustic forces are provided to the medium located in the workspace.

Figure 6:
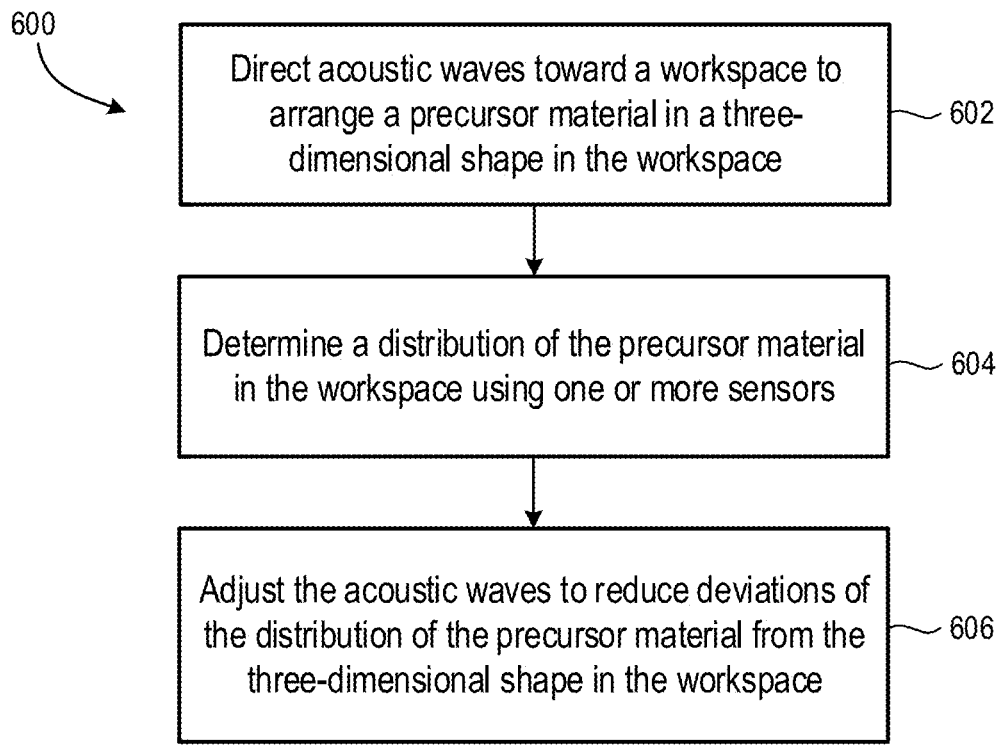
FIG. 6 is a flowchart of a process for generating a three-dimensional shape in a workspace in accordance with one embodiment.

FIG. 6 is a flowchart of a process 600 for generating a three-dimensional shape in a workspace accordance with one embodiment. At least a portion of the process 600 can be implemented using one or more processors operating within the electronic controller 116. Operations of the process 600 include directing acoustic waves toward a workspace to arrange a precursor material in a three-dimensional shape in the workspace (602). In some implementations, the acoustic waves are provided by an array of transducers. In other implementations, the acoustic waves are provided by at least one transducer in combination with an acoustic diffractive device, which may be a variable acoustic diffractive device. In some cases, the variable acoustic diffractive device can include an electrorheological fluid and an array of electrodes arranged to independently provide an electric field to a corresponding portion of the electrorheological fluid in response to signals from an electronic controller. In other cases, the variable acoustic diffractive device can include a non-Newtonian fluid and an array of actuators arranged to independently provide a mechanical stress to a corresponding portion of the non-Newtonian fluid in response to signals from an electronic controller. In still other cases, the variable acoustic diffractive device can include two or more microfluidic channels and a pump arranged to move a fluid into or out of a selected microfluidic channel in response to signals from an electronic controller.

Operations of the process 600 also include determining a distribution of the precursor material in the workspace using one or more sensors (604). In some implementations, the sensors can include at least one of an ultrasound sensor, a computed tomography sensor, a micro-CT sensor, an optical tomography sensor, an infra-red (IR) sensor, or a LIDAR sensor.

The process 600 further includes adjusting the acoustic waves to reduce deviations in the distribution of the precursor material from the three-dimensional shape in the workspace (606). In some implementations, the electronic controller can cause a curing device to cure the precursor material in the workspace in response to determining that the deviations in the distribution of the precursor material from the three-dimensional shape are less than a predetermined threshold. In some cases, curing device can be a radiation source or a reagent source.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them. Data processing apparatus can be incorporated into or in communication with the electronic controllers, such as the electronic controller 116 described above.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Figure 7:
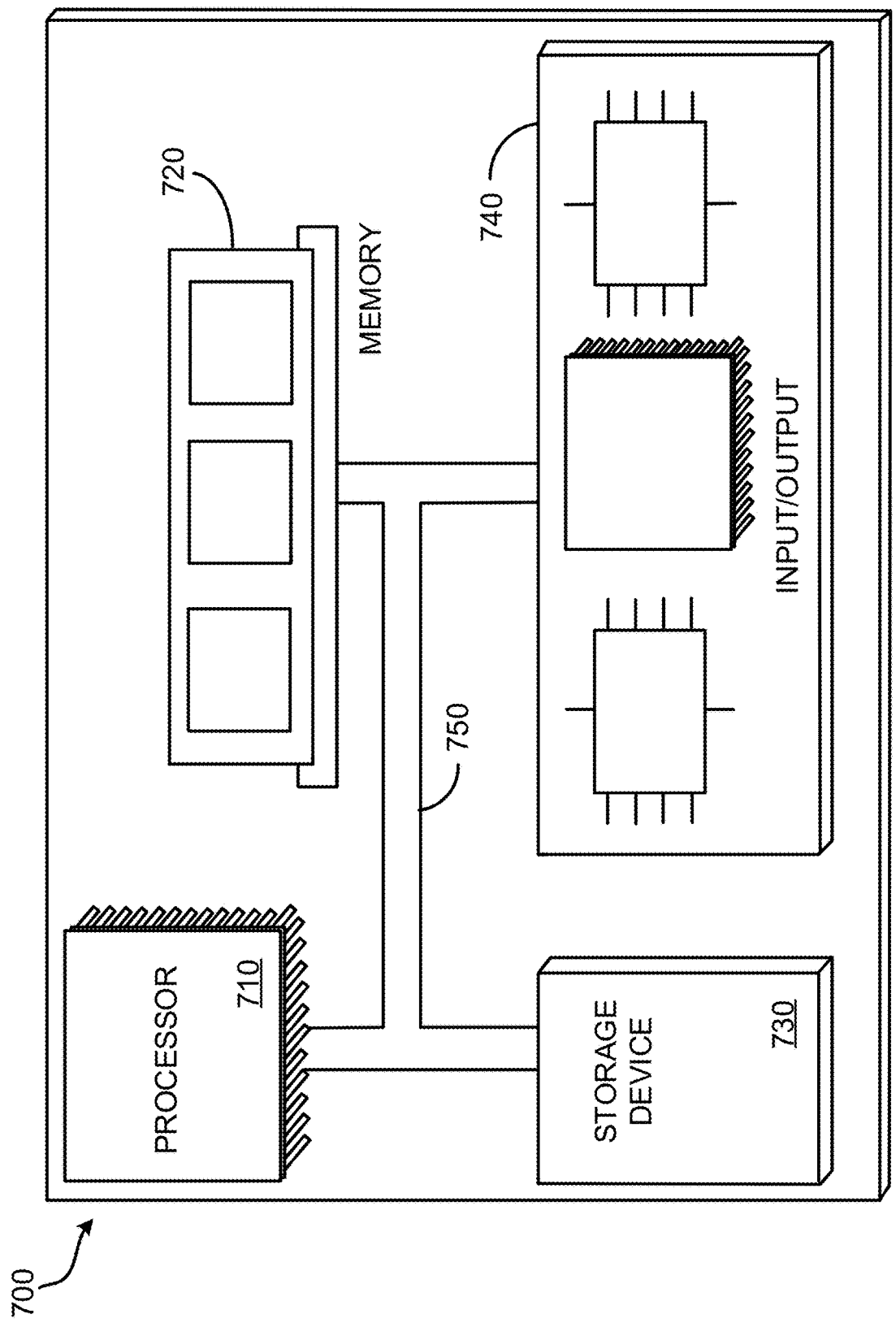
FIG. 7 is a schematic diagram of a computer system that can be used with or form part of the foregoing embodiments.

An example of one such type of computer is shown in FIG. 7, which shows a schematic diagram of a generic computer system 700. The system 700 can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of the present disclosure or on the scope of what may be claimed, but rather as descriptions of features that may be specific to particular embodiments of particular aspects of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

A number of embodiments have been described. Other embodiments are in the following claims.

What is claimed is:
1. A method, comprising:
   directing acoustic waves toward a workspace to arrange a precursor material in a three-dimensional shape in the workspace;
   determining, using one or more sensors, a distribution of the precursor material in the workspace; and
   adjusting the acoustic waves to reduce deviations in the distribution of the precursor material from the three-dimensional shape in the workspace.

2. The method of claim 1, further comprising:
curing at least a portion of the precursor material in the workspace in response to determining that the deviations in the distribution of the portion of the precursor material from the three-dimensional shape are less than a predetermined threshold.

3. The method of claim 1, wherein the acoustic waves are provided by an array of transducers.

4. The method of claim 1, wherein the acoustic waves are provided by at least one transducer in combination with an acoustic diffractive device.

5. The method of claim 4, wherein the acoustic diffractive device is a variable acoustic diffractive device.

6. The method of claim 5, wherein the variable acoustic diffractive device comprises an electrorheological fluid and an array of electrodes arranged to independently provide an electric field to a corresponding portion of the electrorheological fluid in response to signals from an electronic controller.

7. The method of claim 5, wherein the variable acoustic diffractive device comprises a non-Newtonian fluid and an array of actuators arranged to independently provide a mechanical stress to a corresponding portion of the non-Newtonian fluid in response to signals from an electronic controller.

8. The method of claim 5, wherein the variable acoustic diffractive device comprises two or more microfluidic channels and a pump arranged to move a fluid into or out of a selected microfluidic channel in response to signals from an electronic controller.

\* \* \* \* \*